United States Patent
Foo et al.

(10) Patent No.: US 8,533,250 B1
(45) Date of Patent: Sep. 10, 2013

(54) MULTIPLIER WITH BUILT-IN ACCUMULATOR

(75) Inventors: Kok Yoong Foo, Simpang Ampat (MY); Yan Jiong Boo, Bayan Lepas (MY); Geok Sun Chong, Bayan Lepas (MY); Boon Jin Ang, Butterworth (MY); Kar Keng Chua, Juru (MY)

(73) Assignee: Altera Corporation, San Jose, CA (US)

( * ) Notice: Subject to any disclaimer, the term of this patent is extended or adjusted under 35 U.S.C. 154(b) by 1120 days.

(21) Appl. No.: 12/486,231

(22) Filed: Jun. 17, 2009

(51) Int. Cl.
*G06F 7/38* (2006.01)
*G06F 7/00* (2006.01)

(52) U.S. Cl.
USPC ........... 708/523; 708/201; 708/205; 708/209; 708/490

(58) Field of Classification Search
None
See application file for complete search history.

(56) References Cited

U.S. PATENT DOCUMENTS

| | | | |
|---|---|---|---|
| 2003/0005016 A1* | 1/2003 | Tzeng et al. | 708/628 |
| 2004/0098438 A1* | 5/2004 | Chung | 708/523 |

* cited by examiner

*Primary Examiner* — Scott Sun
(74) *Attorney, Agent, or Firm* — Womble Carlyle Sandridge & Rice, LLP

(57) ABSTRACT

Circuits for a multiplier with a built-in accumulator and a method of performing multiplication with accumulation are disclosed. An embodiment of the disclosed circuits includes a logic circuit coupled to receive two inputs. The logic circuit is capable of generating a plurality of value bits from the inputs received. In one embodiment, the logic circuit includes a Booth recoder circuit that generates a plurality of partial products. A block of adders is coupled to logic circuit to receive and sum up the value bits. An adder adds the summation result from the block of adders to a previous accumulated value to generate intermediate sum and carry values. An accumulator, coupled to the adder, receives and stores the intermediate values.

20 Claims, 6 Drawing Sheets

MULTIPLIER WITH BUILT-IN ACCUMULATOR

BACKGROUND

Digital signal processing (DSP) blocks are used for implementing high-speed multiplication functions. DSP blocks in programmable devices are increasingly used in applications such as video and image processing. Often, DSP blocks perform not only multiplication, but also multiplication with addition, subtraction or accumulation. For instance, the sum of multiplication results is useful in applications such as finite impulse response (FIR) filtering and discrete cosine transforms (DCTs). As such, DSP blocks in integrated circuits (ICs) or programmable devices usually include at least a multiplier and an accumulator to perform all the required functions.

Generally, additional DSP functions like addition, subtraction and accumulation are implemented after the multiplier. Dedicated digital signal processing (DSP) blocks usually have embedded multiplier-accumulator blocks. But for lower-end devices, these DSP blocks may only have embedded multiplier blocks without a built-in accumulator. These devices can still perform normal multiplication. However, if accumulation of a series of multiplication results is needed, then other resources in the devices may need to be used. For instance, memory blocks may be used as look-up tables (LUTs) to store multiplication results. This would inevitably result in slower calculation speeds as compared to having a built-in accumulator.

Therefore, it is desirable to have a built-in accumulator function within the multiplier block even for lower-end devices. Having a built-in accumulator inside the multiplier block also enables the multiplier to effectively perform various different modes, e.g., multiplication, accumulation and multiplication followed by addition. It is within this context that the invention arises.

SUMMARY

Embodiments of the present invention include circuits and a method for performing multiplication with accumulation.

It should be appreciated that the present invention can be implemented in numerous ways, such as a process an apparatus, a system, a device or a method on a computer readable medium. Several inventive embodiments of the present invention are described below.

In one embodiment, a multiplier is disclosed. The multiplier has a logic circuit coupled to receive first and second inputs. In one embodiment, the logic circuit is a partial product generation circuit that generates the partial products of the first and second inputs. A block of adders is coupled to the logic circuit. The block of adders receives and sums the partial products to generate a sum value and a carry value. An adder is coupled to receive the sum value, the carry value and an accumulator value. These values are added by the adder to generate an intermediate value that is stored in an accumulator coupled to the output of the adder.

In another embodiment, a DSP circuit is disclosed. The DSP circuit has a storage element that receives multiple input values. A logic circuit is coupled to the output of the storage element. The logic circuit is capable of generating a plurality of partial products based on the input values. In one embodiment, the logic circuit includes a Booth encoding circuit. Multiple adders are coupled to receive the plurality of partial products. The partial products are added to generate a sum value and a carry value. A 3:2 adder is coupled to receive the sum and carry values from the multiple adders. The 3:2 adder is configured to generate intermediate sum and carry values. An accumulator is coupled to receive the intermediate sum and carry values from the 3:2 adder.

In yet another embodiment in accordance with the present invention, a method for performing multiplication with accumulation based on first and second operands is disclosed. The method includes receiving the first and second operands. The first operand received may be a multiplicand and the second operand received may be a multiplier. Partial products are generated based on the first and second operands. The number of partial products generated may be reduced with Booth's algorithm. All the partial products are added to generate intermediate sum and carry values. The intermediate sum and carry values may be added to a previous accumulated value with a 3:2 adder to generate an intermediate accumulated value. The intermediate accumulated value is stored in an accumulator.

Other aspects of the invention will become apparent from the following detailed description, taken in conjunction with the accompanying drawings, illustrating by way of example the principles of the invention.

BRIEF DESCRIPTION OF THE DRAWINGS

The invention may best be understood by reference to the following description taken in conjunction with the accompanying drawings in which.

DETAILED DESCRIPTION

The following embodiments describe circuits and a method for performing multiplication with accumulation.

It will be obvious, however, to one skilled in the art, that the present invention may be practiced without some or all of these specific details. In other instances, well-known operations have not been described in detail in order not to unnecessarily obscure the present invention.

The embodiments described herein provide techniques to create a multiplier circuit with a built-in accumulator. The disclosed embodiments provide a more cost-effective solution for a multiplier with a built-in accumulator circuit. A DSP block that performs multiplication with accumulation will have an accumulator placed outside of the multiplier block. However, having a separate accumulator that is placed outside the multiplier block is slow and may not be a cost-effective solution overall. Typically, an additional adder, e.g., a carry look-ahead adder (CLA), is placed outside the multiplier block to perform the accumulation function. The CLA is generally bigger in size compared to a carry-save adder (CSA). As such, placing an additional CLA outside of the multiplier block may increase the area of the DSP block on the device. One embodiment describes a multiplier circuit with an additional adder placed in between a block of adders and a CLA adder within the multiplier block. This additional adder receives a feedback input that can be a previous accumulated value. The additional adder thus acts as an accumulator by performing the summation of the previous accumulated value with a current multiplication value. Hence, the conventional accumulator that is coupled to the multiplier circuit block is no longer needed. Another embodiment describes a multiplier circuit that performs a variety of arithmetic functions, e.g., multiplication, accumulation of multiplication results and multiplication with addition. The multiplier circuit includes a selector circuit in addition to an additional adder. The selector circuit is coupled to an input of the additional adder and can be configured to supply either a previous accumulated value, an individual input value or a constant value to the adder.

Figure 1A:
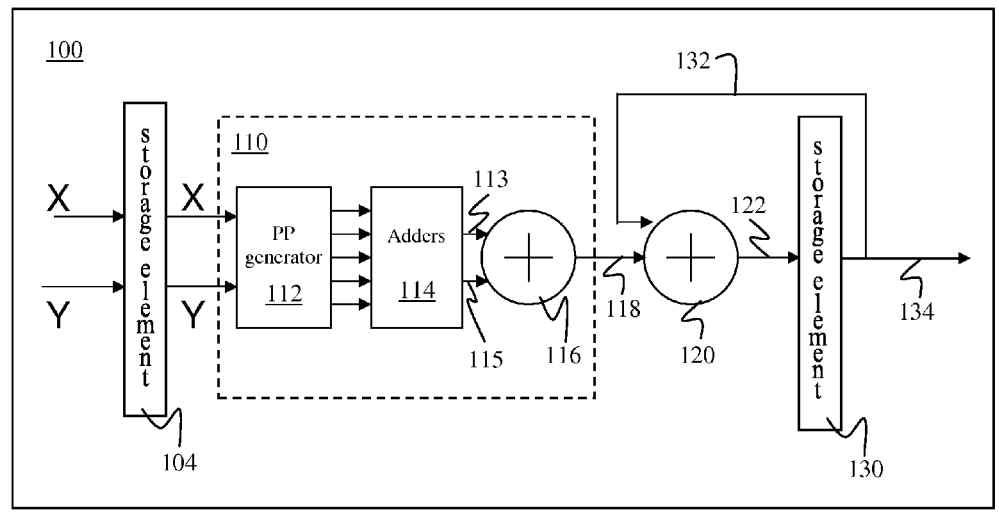
FIG. 1A shows an exemplary DSP circuit block with an accumulator coupled to a multiplier block.

FIG. 1A shows an exemplary DSP circuit block 100 with accumulator 120 coupled to multiplier block 110. DSP circuit 100 receives inputs X and Y at storage element 104. Storage element 104 may be an input register, e.g., a flip flop, a latch, etc. The two inputs, X and Y, are outputs from storage element 104 to multiplier 110. In one embodiment, X is a multiplier and Y is a multiplicand supplied to multiplier 110. Logic circuit 112 in multiplier 110 receives inputs X and Y. In one embodiment, logic circuit 112 includes logic elements for generating partial products based on multiplier X and multiplicand Y. A Booth recoding circuit may also be included in logic circuit 112 to reduce the number of partial products generated. The commonly used Booth recoding and partial product generation logic are well known in the art and have been left out for clarity. A block of adders 114 is connected to logic circuit 112 to receive all the partial products generated. The block of adders 114 sums up all the partial products to produce a multiplication result. In one embodiment, the block of adders 114 consists of multiple 3:2 and 4:2 compressors or carry-save adders (CSAs) configured to sum all the partial products up to generate a sum output and a carry output, i.e., output 113 and output 115, respectively. Outputs 113 and 115 are combined by a final adder, i.e., adder 116, to generate a final multiplication value. In an exemplary embodiment, adder 116 is a carry look-ahead adder (CLA). Accumulator 120, placed outside of multiplier block 110, is coupled to receive output 118 from multiplier 110 and feedback output 132 from storage element 130. Feedback output 132 may be a previous multiplication result that is added to the current multiplication result from output 118. The final multiplication with accumulation result is carried out by DSP circuit 100 through output 134.

Figure 1B:
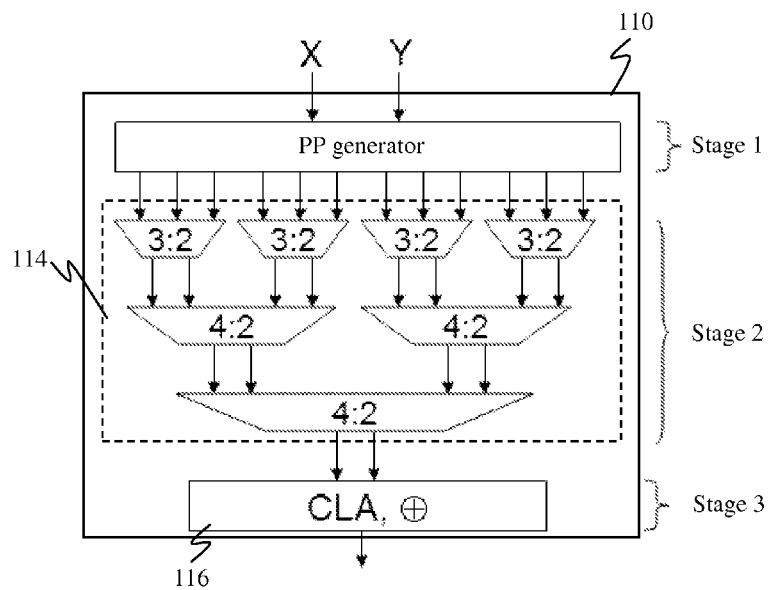
FIG. 1B, meant to be illustrative and not limiting, shows a multiplier circuit with banks of CSA adders.

FIG. 1B, meant to be illustrative and not limiting, shows multiplier circuit 110 with banks of CSA adders. In one embodiment, multiplier circuit 110 is a Booth Radix-4 multiplier circuit. As shown in FIG. 1B, multiplier circuit 110 can be divided into three stages. The first stage is the partial product generation stage, while the second and third stages are the partial product accumulation stage and final summation stage, respectively. Based on this example, logic circuit 112 is a partial product generator that generates a plurality of partial products based on inputs X and Y. These partial products are received by a plurality of 3:2 CSA adders in the partial product accumulation stage. The adders perform a multi-operand addition for all the generated partial products and produce a result in carry-save form. In one embodiment, the last adder in the tree of CSA adders shown in FIG. 1B produces a sum output and a carry output as the result of the summation of all the partial products. Finally, the carry-save form output, i.e., sum with carry output, is converted to a final binary output by adder 116 at the final summation stage. It should be appreciated that even though a CLA adder is shown as adder 116, other types of adder, e.g., a parallel prefix adder (PPA), can also be used. Even though a specific number of 3:2 and 4:2 CSA adders are shown in FIG. 1B, one skilled in the art should appreciate that more or fewer adders, either of the same type or of different types, can be used in the partial product accumulation stage.

Figure 2:
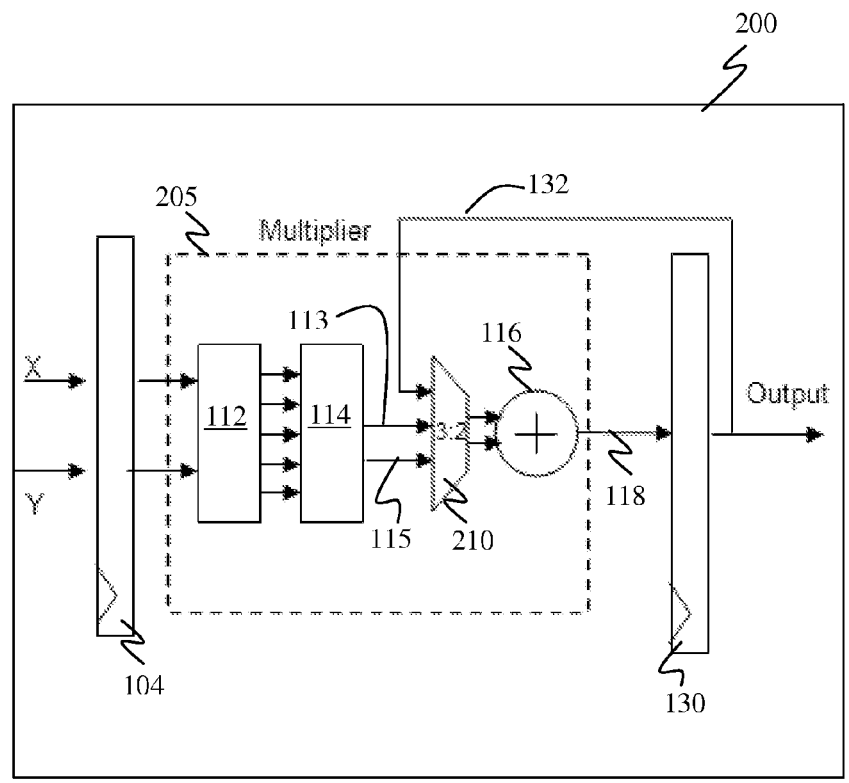
FIG. 2, meant to be illustrative and not limiting, shows a multiplier circuit with a built-in accumulator embedded in a circuit block as an embodiment in accordance with the present invention.

FIG. 2, meant to be illustrative and not limiting, shows multiplier circuit 205 with a built-in accumulator embedded in circuit block 200 as an embodiment in accordance with the present invention. In one embodiment, circuit block 200 may be a DSP circuit in a programmable logic device (PLD). For the sake of brevity, elements shown in FIGS. 1A and 1B and described in earlier paragraphs, e.g., storage element 104, logic circuit 112, adder block 114 and output register 130, are not repeated or described in detail here. Adder 210 is placed in between adder block 114 and adder 116. In one embodiment, adder 210 is a 3:2 CSA adder that receives sum output 113 and carry output 115 from adder block 114 and feedback output 132 from output register 130. It should be appreciated that although adder 210 is shown as a 3:2 CSA adder, other types of adder can be used in this context. The 3:2 adder, i.e., adder 210, generates an intermediate sum output and an intermediate carry output by adding all the three inputs received. The final adder, adder 116, receives the intermediate sum output and the intermediate carry output from adder 210 and combines the intermediate sum and carry outputs to generate a final binary output. In one embodiment, feedback output 132 is a previous accumulated value from previous multiplication results and the final binary output is a current accumulated multiplication result. Therefore, in this embodiment, adder 210 functions as an accumulator by adding the current multiplication result with the previous accumulated value. In the embodiment of FIG. 2, accumulator 120 as shown in FIG. 1B is no longer needed and output 118, which carries the accumulated multiplication result, is connected to output register 130.

Figure 3:
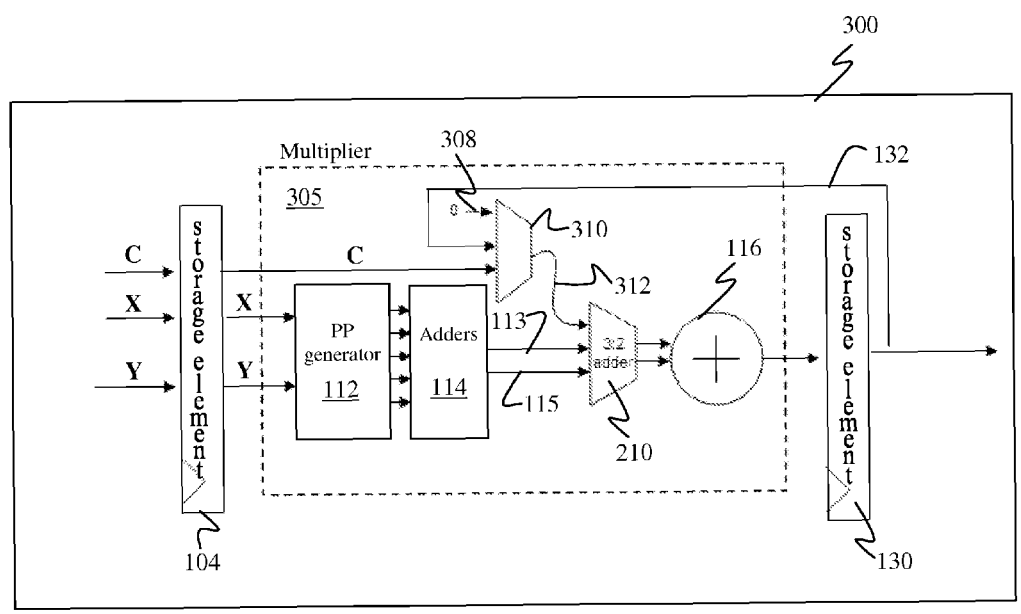
FIG. 3, meant to be illustrative and not limiting, shows a circuit with an embedded multiplier block.

FIG. 3, meant to be illustrative and not limiting, shows circuit 300 with multiplier circuit 305. Circuit 300 is similar to circuit 200 of FIG. 2 with the exception that selector circuit 310 is placed in multiplier circuit 305 to enable multiplier circuit 305 to perform more arithmetic functions than multiplier circuit 205 of FIG. 2. Storage element 104 receives an additional input value C apart from multiplier X and multiplicand Y. Input value C may be an external value received from another circuit that is coupled to circuit 300, e.g., an input value received by an integrated circuit that circuit 300 is embedded in. Input value C may also be a constant value that is added to the result of the multiplication of X and Y. Selector circuit 310 selects either input value C, feedback output 132 or a constant value as output 312. Output 312 is coupled to an input of adder 210. Hence, selector circuit 310 supplies either a constant value, an accumulated value (feedback output 132) or input value C to adder 210. Depending on the operation to be performed by multiplier 305, an appropriate input is selected and transmitted as an input to adder 210. For instance, if multiplier 305 is configured to perform a simple multiplication (X*Y), then selector circuit 310 would transmit a constant value (in this case, a logic low level or 0) to adder 210. If multiplier 305 is configured to perform multiplication with accumulation $[(X*Y)+(X*Y)_{previous}]$, then selector circuit 310 would transmit feedback output 132, i.e., the previous accumulated value, as an input to adder 210. Finally, if multiplier 305 is configured to generate a summation of a multiplication with a specific value [(X*Y)+C], then selector circuit 310 would transmit input value C to adder 210. In one embodiment, selector circuit 310 is a multiplexer with select bits outside of circuit 300. In an exemplary embodiment, the select bits may be tied to an input port of a DSP circuit and are configurable by a user. In an alternative embodiment, the select bits may also be set using configuration random access memory (CRAM) bits on a device. Depending on how the select bits are set, the multiplexer or selector circuit 310 can be configured to transmit a corresponding value to adder 210.

Figure 4:
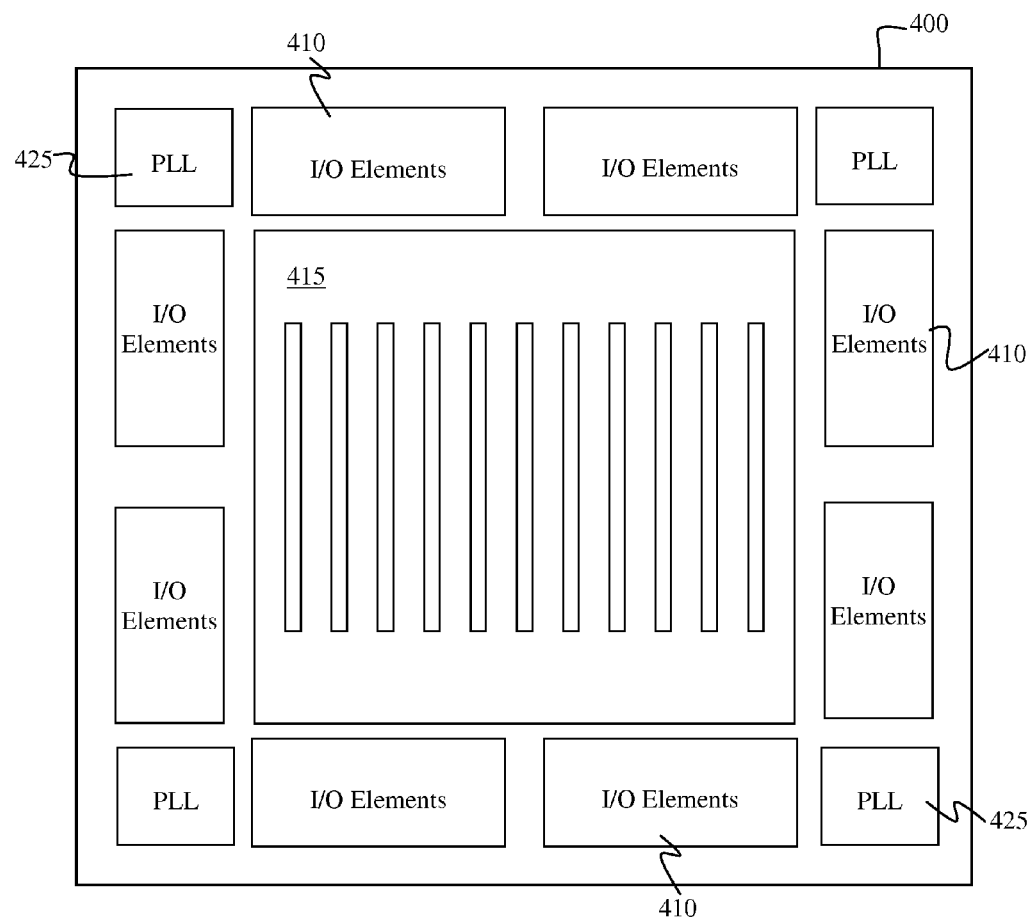
FIG. 4, meant to be illustrative and not limiting, shows a simplified block diagram of a PLD that can include aspects of the present invention.

FIG. 4, meant to be illustrative and not limiting, shows a simplified block diagram of PLD 400 that can include aspects of the present invention. Programmable device 400 includes logic region 415 and I/O elements 410. I/O elements 410 may support a variety of memory interfaces. Other auxiliary circuits such as phase-locked loops (PLLs) 425 for clock generation and timing, can be located outside the core logic region 415, e.g., at corners of programmable device 400 and adjacent to I/O elements 410. Logic region 415 may be populated with logic cells which include, among other things, at the most basic level, "logic elements" (LEs). LEs may include look-up table-based logic regions and these logic elements may be grouped into "Logic Array Blocks" (LABs). The logic elements and groups of logic elements or LABs can be configured to perform logical functions desired by the user. Logic region 415 may also include a plurality of embedded memory blocks, and embedded multipliers. In one embodiment, logic region 415 includes a plurality of embedded 18 bit×18 bit multipliers. At least some of these embedded multipliers are multipliers with a built-in accumulator, similar to multipliers 205 and 305 shown in FIGS. 2 and 3, respectively.

Figure 5:
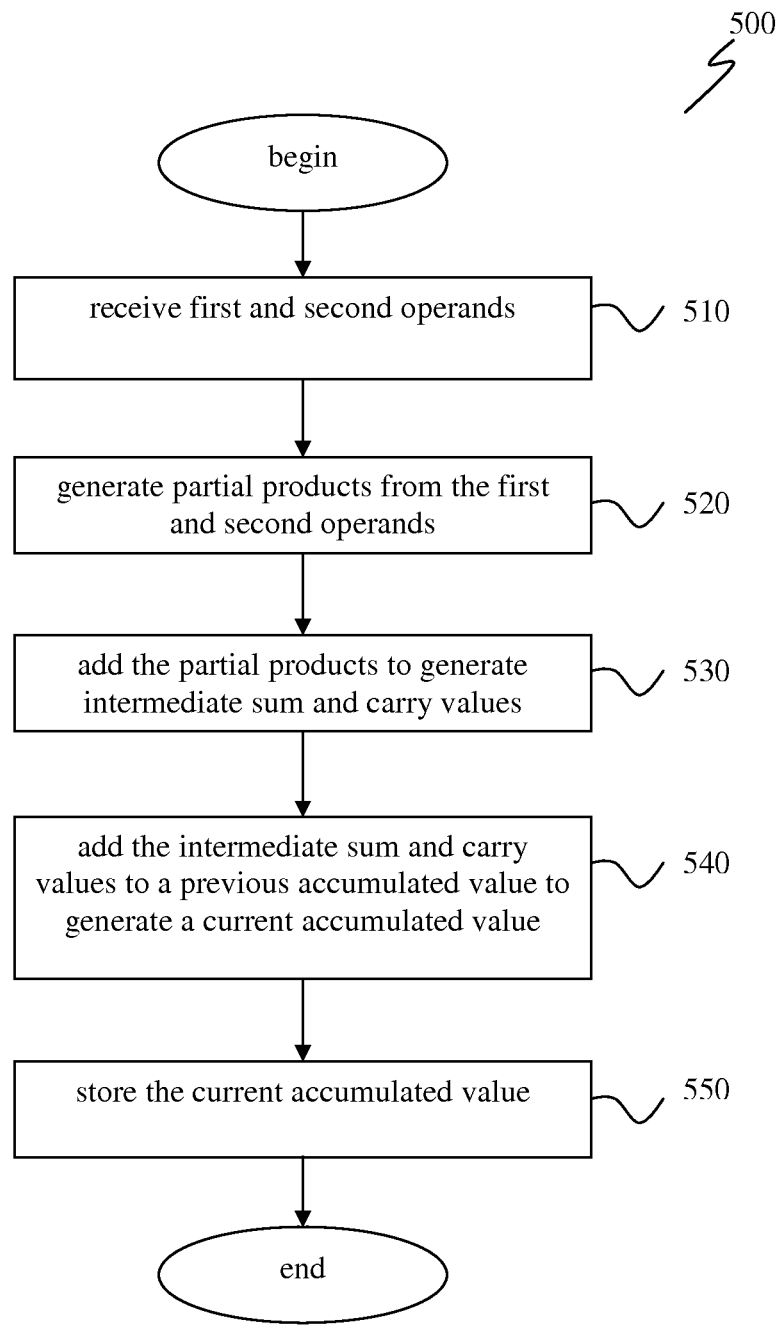
FIG. 5, meant to be illustrative and not limiting, shows a simplified method flow for performing multiplication with accumulation as an embodiment in accordance with the present invention.

FIG. 5, meant to be illustrative and not limiting, shows simplified method flow 500 for performing multiplication with accumulation as an embodiment in accordance with the present invention. A first operand and a second operand is received in operation 510. In one embodiment, the first operand is a multiplier and the second operand is a multiplicand. Partial products are generated in operation 520. The number of partial products generated may be reduced with Booth recoding. All the partial products are summed to generate an intermediate sum and an intermediate carry value in operation 530. In the illustrative embodiment of FIG. 3, multiple banks of 3:2 and 4:2 CSA adders, i.e., adder block 114, are used to generate the intermediate sum and carry values. The intermediate sum value and the intermediate carry value are added to a previous accumulated value to generate a current accumulated multiplication result in operation 540. As shown in the illustrative embodiment of FIGS. 2 and 3, 3:2 CSA adder 210 is used to add the intermediate sum and carry values, outputs 113 and 115, respectively, to the previous accumulated value, i.e., feedback output 132. In one embodiment, a selector circuit, e.g., selector circuit 310 of FIG. 3, can be used to supply either a constant value, a previous accumulated value or an external input value to generate a multiplication result, a multiplication with accumulation result or a multiplication with addition result, respectively. The current accumulated multiplication result is stored in operation 550. In an exemplary embodiment, the accumulated result generated is stored in an output register before being transmitted to another circuit.

Figure 6:
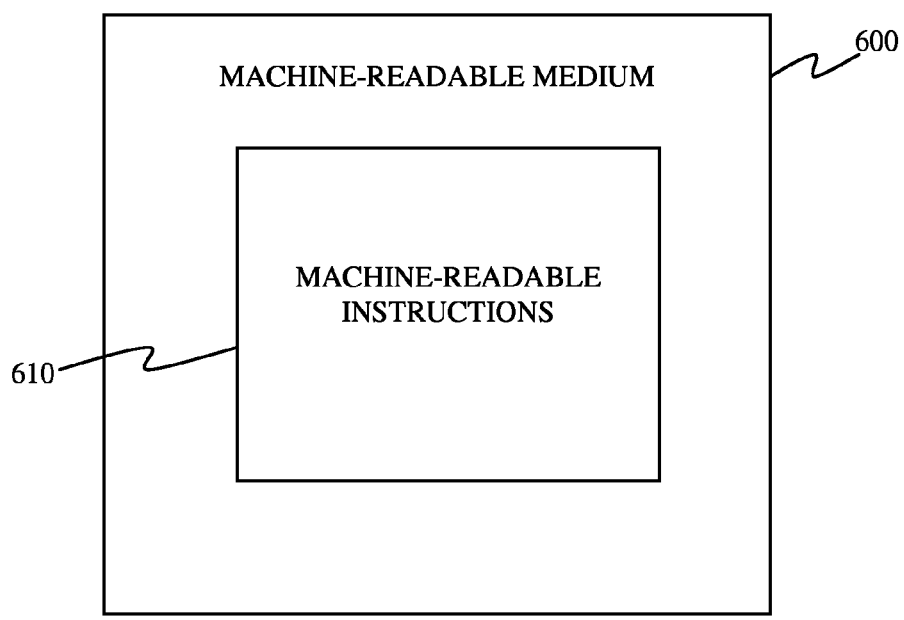
FIG. 6 shows a machine-readable medium encoded with machine-readable instructions.

The invention can also be embodied as machine-readable instructions 610 on machine-readable medium 600 as shown in FIG. 6. Machine-readable medium 600 is any data storage device that can store data, which can thereafter be read by a machine or a computer system. Illustrative examples of machine-readable medium 600 include hard drives, network attached storage (NAS), read-only memory, random-access memory, CDs, DVDs, USB drives, volatile and non-volatile memory, and other optical and non-optical data storage devices. Machine-readable medium 600 can also be distributed over a network-coupled computer system so that machine-readable instructions 610 are stored and executed in a distributed fashion. Machine-readable instructions 610 can perform the steps illustrated in FIG. 5.

The embodiments, thus far, were described with respect to integrated circuits. The method and apparatus described herein may be incorporated into any suitable circuit. For example, the method and apparatus may be incorporated into numerous types of devices such as microprocessors or programmable logic devices. Exemplary programmable logic devices include programmable array logic (PAL), programmable logic array (PLA), field programmable logic array (FPLA), electrically programmable logic devices (EPLD), electrically erasable programmable logic device (EEPLD), logic cell array (LCA), field programmable gate array (FPGA), application specific standard product (ASSP), application specific integrated circuit (ASIC), just to name a few.

The programmable logic device described herein may be part of a data processing system that includes one or more of the following components; a processor; memory; I/O circuitry; and peripheral devices. The data processing system can be used in a wide variety of applications, such as computer networking, data networking, instrumentation, video processing, digital signal processing, or any suitable other application where the advantage of using programmable or re-programmable logic is desirable. The programmable logic device can be used to perform a variety of different logic functions. For example, the programmable logic device can be configured as a processor or controller that works in cooperation with a system processor. The programmable logic device may also be used as an arbiter for arbitrating access to a shared resource in the data processing system. In yet another example, the programmable logic device can be configured as an interface between a processor and one of the other components in the system. In one embodiment, the programmable logic device may be one of the family of devices owned by the assignee.

Although the method operations were described in a specific order, it should be understood that other operations may be performed in between described operations, described operations may be adjusted so that they occur at slightly different times or described operations may be distributed in a system which allows the occurrence of the processing operations at various intervals associated with the processing, as long as the processing of the overlay operations are performed in a desired way.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A multiplier, comprising:
 a logic circuit coupled to receive first and second inputs, wherein the logic circuit generates a plurality of value bits based on the first and second inputs;

a block of adders coupled to receive the plurality of value bits, wherein the block of adders generates a sum value and a carry value from the plurality of value bits;

an adder coupled to receive the sum value, the carry value and an accumulator value to generate an intermediate sum value and an intermediate carry value; and an accumulator coupled to receive the intermediate sum value and the intermediate carry value, wherein the accumulator stores the intermediate sum value and the intermediate carry value.

2. The multiplier of claim 1, wherein the logic circuit comprises a booth recoder circuit, that generates a plurality of partial products based on the first and second inputs.

3. The multiplier of claim 1, wherein the first input is a multiplier and the second input is a multiplicand.

4. The multiplier of claim 1, wherein the accumulator value is a previous output value from the multiplier.

5. The multiplier of claim 1, wherein the block of adders comprises a plurality of 3:2 and 4:2 carry-save adders (CSAs).

6. The multiplier of claim 1, wherein the adder is a 3:2 CSA adder.

7. The multiplier of claim 1, wherein the multiplier is integrated into a digital signal processing (DSP) circuit.

8. The multiplier of claim 1, further comprising:
a selector circuit coupled to receive a third input, a logic value and the accumulator value, wherein the selector circuit couples one of the third input, the logic value or the accumulator value to the adder.

9. The multiplier of claim 8, wherein the selector circuit is a multiplexer and wherein the logic value is set to a logic low value.

10. A digital signal processing (DSP) circuitry, comprising:
a storage element coupled to receive a first value and a second value;
a logic circuit coupled to receive the first and second values, wherein the logic circuit generates a plurality of partial products based on the first and second values;
a plurality of adders coupled to receive the plurality of partial products, wherein the plurality of adders generates a sum value and a carry value based on the plurality of partial products;
a 3:2 adder coupled to the plurality of adders, the 3:2 adder configured to generate an intermediate sum value and an intermediate carry value; and
an accumulator coupled to receive the intermediate sum value and the intermediate carry value, wherein the accumulator stores the intermediate sum value and the intermediate carry value.

11. The DSP circuitry of claim 10, further comprising:
a selector circuit coupled to receive a third value, a logic low value and a previous summation value, wherein the selector circuit selects one of the third input value, the logic low value or the previous summation value as an input to the 3:2 adder.

12. The DSP circuitry of claim 10, further comprising:
an output register configured to receive an output from the accumulator.

13. The DSP circuitry of claim 10, wherein an output from the accumulator is added to a current intermediate sum value and a current carry value iteratively.

14. A method of performing multiplication with accumulation based on first and second operands, comprising:
receiving the first and second operands, wherein the first operand is a multiplicand and the second operand is a multiplier;
generating a plurality of partial products based on the first and second operands;
adding the plurality of partial products to generate an intermediate sum value and an intermediate carry value;
adding the intermediate sum value and the intermediate carry value to a previous accumulated value to generate an intermediate accumulated value; and
storing the intermediate accumulated value, wherein at least one step of the method is performed by a processor.

15. The method of claim 14, further comprising:
reducing the plurality of partial products with Booth recoding before the adding of the plurality of partial products.

16. The method of claim 14, further comprising:
selecting a value between a logic value, a third operand and an output from an accumulator; and
adding the selected value to the plurality of partial products to generate the intermediate accumulated value.

17. The method of claim 14, further comprising:
receiving a third operand, and
adding the third operand to the intermediate accumulated value.

18. The method of claim 17, wherein the third operand is an external value.

19. A nontransient, tangible, machine-readable medium encoded with machine-readable instructions for performing the method defined in claim 14.

20. The method of claim 14, further comprising:
receiving an output value from an output register; and
adding the output value and the plurality of partial products to generate the intermediate accumulated value.

* * * * *